United States Patent [19]

Maxwell et al.

[11] Patent Number: 4,749,168
[45] Date of Patent: Jun. 7, 1988

[54] DAMPER PLATE SEALING MECHANISM

[75] Inventors: Ronald K. Maxwell, Irving, Tex.; Robert K. Broyles, Knoxville, Tenn.

[73] Assignee: Pathway Bellows, Inc., El Cajon, Calif.

[21] Appl. No.: 817,815

[22] Filed: Jan. 10, 1986

[51] Int. Cl.⁴ .......................... F16K 3/20; F16K 25/00
[52] U.S. Cl. .................................. 251/174; 251/327; 251/328; 126/285 A; 138/94.3
[58] Field of Search ................. 126/285 A; 137/240; 138/94.3; 251/172, 174, 176, 326, 327, 328, 329

[56] References Cited

U.S. PATENT DOCUMENTS

| | | | |
|---|---|---|---|
| 1,476,344 | 12/1923 | McGee et al. | 126/285 A |
| 2,582,877 | 1/1952 | Mekler | 126/285 A |
| 2,777,664 | 1/1957 | Bryant | 251/174 |
| 3,228,389 | 1/1966 | Lowe et al. | 126/285 A |
| 4,022,241 | 5/1977 | Fox | 137/240 |
| 4,088,146 | 5/1978 | Hagar | 251/174 |
| 4,163,458 | 8/1979 | Bachmann | 137/240 |
| 4,176,673 | 12/1979 | Connor | 137/240 |
| 4,334,550 | 6/1982 | Connor et al. | 137/240 |
| 4,474,205 | 10/1984 | Dreyer et al. | 251/172 |
| 4,491,144 | 1/1985 | Dreyer et al. | 137/240 |
| 4,561,472 | 12/1985 | Dreyer et al. | 137/240 |

Primary Examiner—George L. Walton
Attorney, Agent, or Firm—Lane and Aitken

[57] ABSTRACT

In a sealing mechanism for a damper plate for a duct, seal members are made in the form of multi-convoluted sheet metal bellows, which engage each side of the damper plate around the periphery of the duct. When the duct is moved from an open position to a closed position, it slides between the seal elements forcing them apart. When the plate is slid from a closed position to an open position, the spring bias in the bellows members will cause them to expand to engage each other.

14 Claims, 4 Drawing Sheets

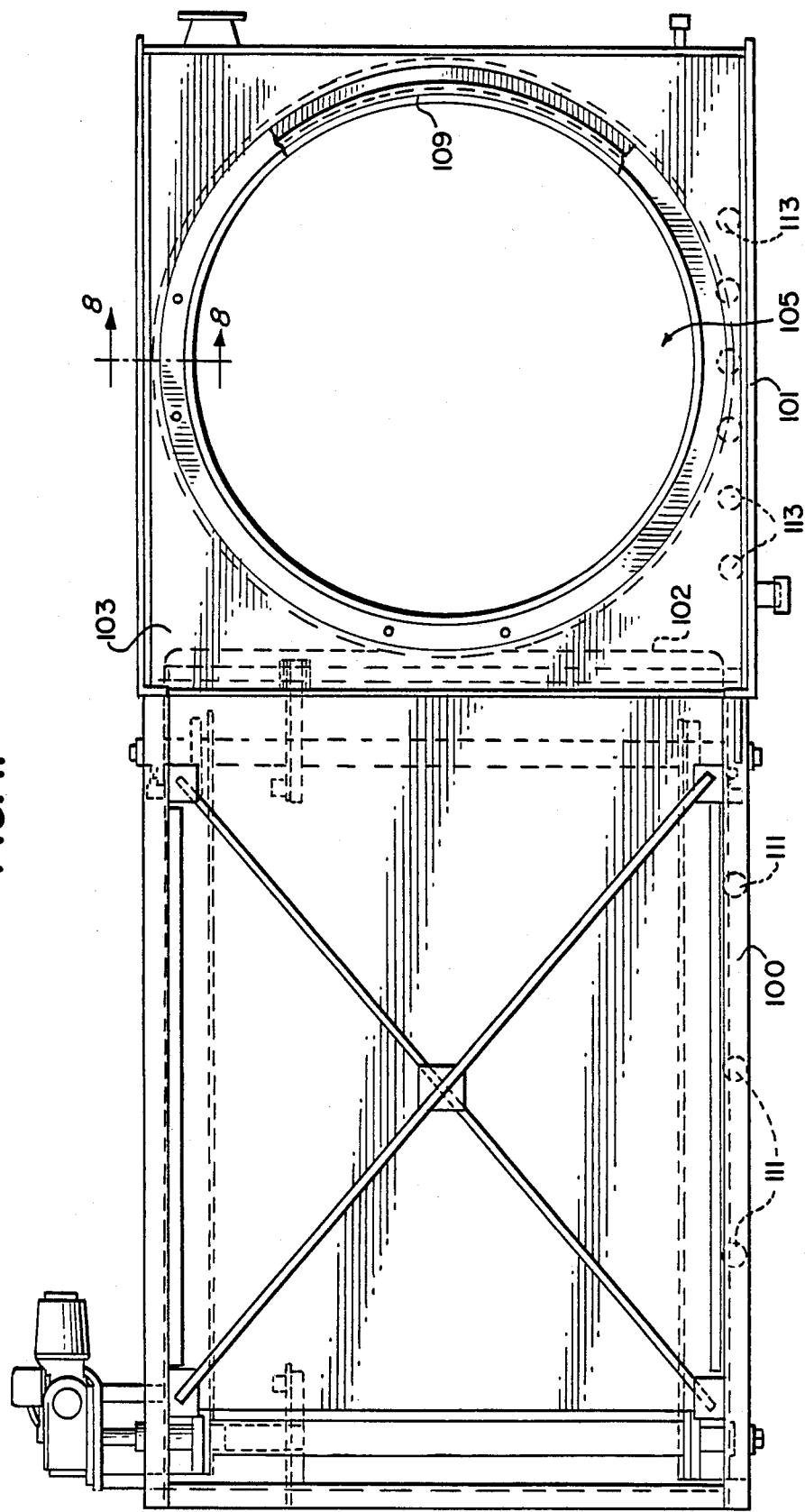

DAMPER PLATE SEALING MECHANISM

This invention relates to damper plate seals and more particularly to an improved sealing mechanism for a sliding damper plate used to control gas flow in a duct.

In ducts used to channel gas flow, a sliding damper plate can be used to open or close the duct. The damper plate is mounted in a frame, which in turn is mounted between duct sections and the damper plate is slidable between an open position in which it is outside of the duct and a closed position in which it blocks the duct. In such an arrangement, it is important to provide stationary frame mounted seals between the plate and the frame to prevent leakage of the duct gas to the duct surroundings or vice versa. In the prior art systems, the damper plate seals have been provided in the form of flat leaf seal members, but these seals are subject to a considerable amount of leakage. This leakage is particularly objectionable when the duct gas and the downstream area of the duct and duct surroundings must be isolated from upstream areas containing flue gas.

SUMMARY OF THE INVENTION

The present invention provides a seal for the damper plate which substantially eliminates leakage. In accordance with the invention, the seal members are made in the form of multiconvoluted sheet metal bellows, which engage each side of the damper plate around the periphery of the duct. The bellows shaped seal members provide improved gas isolation over existing technology because bellows sections can be butted and formed around the periphery to form a single flap sealing surface free from any overlaps. Accordingly, the seal can engage the damper plate with a continuous contact around the periphery. As a result, a source of considerable gas leakage in existing technology is eliminated. In addition, the bellows shaped seal member permits a high spring force in the seal members to ensure tight contact of the seal members to the damper plate. The bellows shape also permits the plate to be fed through the seals without the need for guides or feed strips to start the plate through the seal members when the plate is being moved from an open position to a closed position, thus eliminating another cause of leakage in prior art systems. The seal structure of the present invention provides isolation between the duct gas and the duct surroundings of 99.95% to 100%.

In addition to the advantage of reducing gas leakage, the present invention also has the advantage in that the bellows shaped seal members can be provided in thicker materials because flexure stresses in the bellows shaped arrangement can be reduced lower than in prior art designs. The thicker materials make the design able to resist corrosive attack for a longer period of time. As a result and also because the bellows shape is more durable than the leaf spring design, the seal mechanism of the present invention has an extended life over the systems of the prior art.

BRIEF DESCRIPTION OF THE DRAWING

FIG. 7 is an elevational view of yet another embodiment of the damper plate sealing mechanism of the present invention.

DESCRIPTION OF THE PREFERRED EMBODIMENTS

Figure 1:
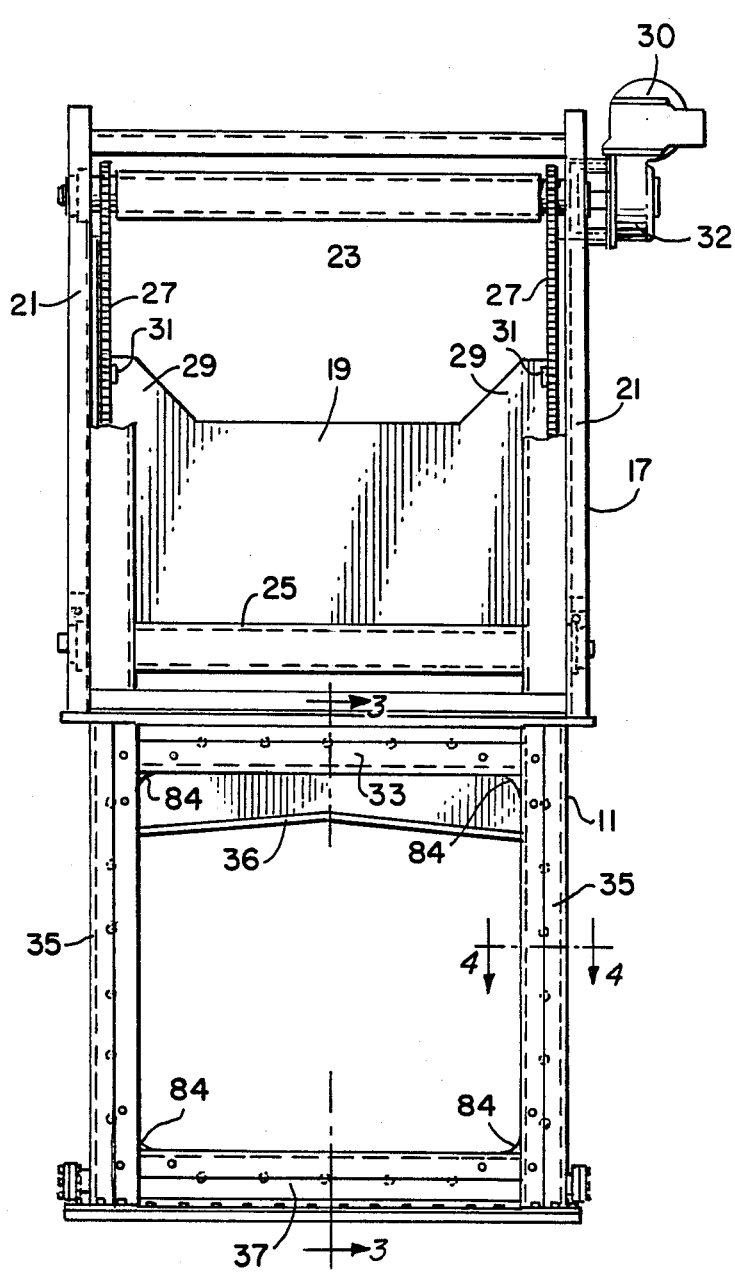
FIG. 1 is an elevational view of one embodiment of the damper plate mechanism of the present invention.
Figure 2:
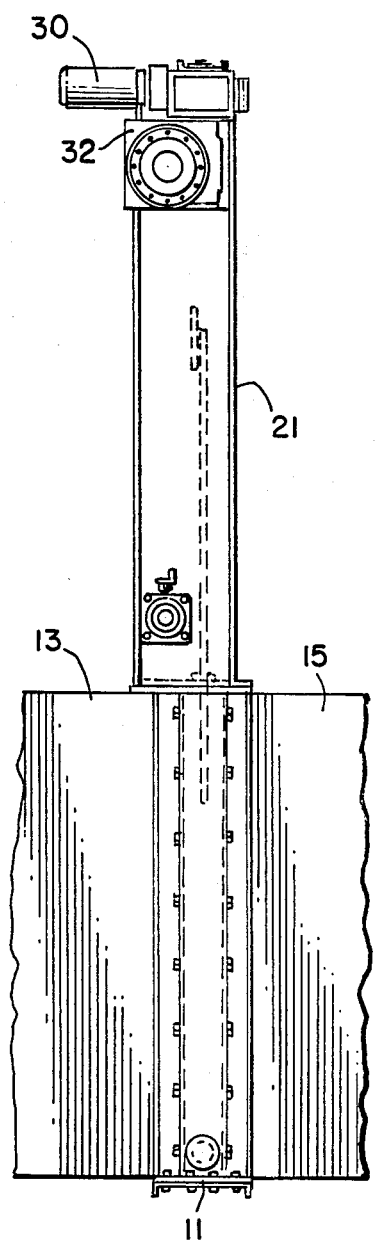
FIG. 2 is a side view in elevation showing the mechanism of FIG. 1 connected between two duct sections.

As shown in FIGS. 1 and 2, the bellows damper plate sealing mechanism of the present invention comprises a lower frame member 11 which is mounted between duct sections 13 and 15 to control the flow between the duct sections 13 and 15. Mounted on the lower frame section is an upper frame member 17 and a damper plate 19 is movable from an open position in which the damper plate is in the upper frame member and a closed position in which the damper plate is in the lower frame member 11 closing off flow between the duct sections 13 and 15. In this embodiment as best shown in FIG. 1, the lower frame member 11 is rectangular to correspond in shape to rectangular duct sections 13 and 15.

The upper frame member 17 comprises vertical side sections 21 supporting at their upper ends a torque tube 23 rotatably mounted on and extending between the side sections 21. The vertical side sections 21 support at their lower ends, a torque tube 25 also rotatably mounted in and extending between the side sections 21. Adjacent to the side sections 21 are endless chains 27, which are trained around sprockets (not shown) on the torque tubes 23 and 25. The damper plate 19 is formed with extensions 29 at the upper corners thereof and the chains 27 are fixed to these extensions 29 by means of chain anchors 31. The torque tube 23 is rotatably driven by a motor 30 through a gear mechanism 32 mounted on one of the side sections 21. By rotating the torque tube 23 and thereby driving the chains 27, the plate 19 can be moved between the open and closed position.

Figure 3:
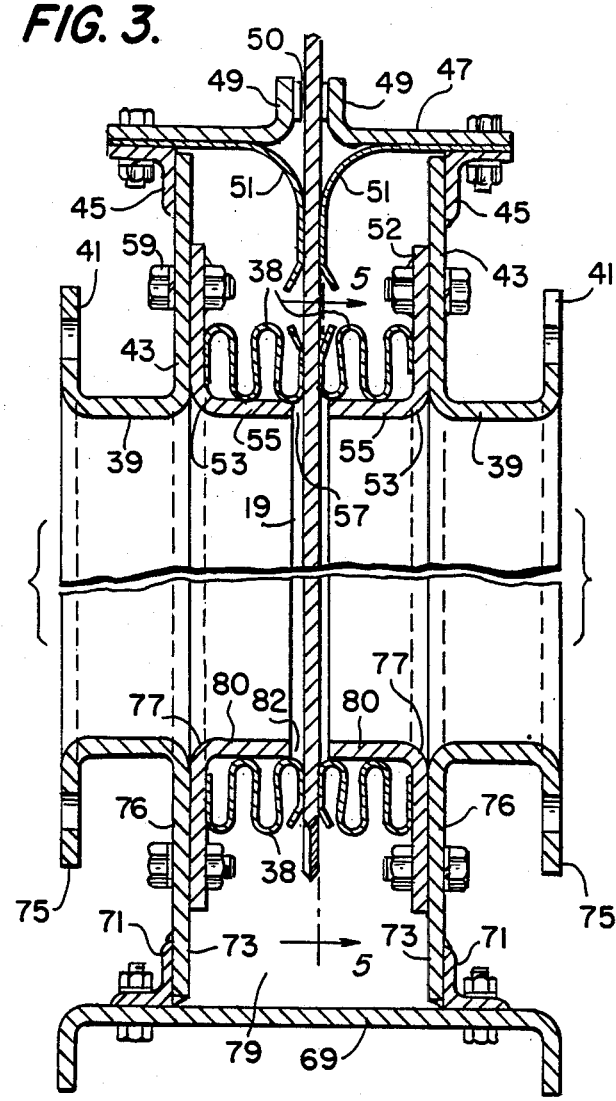
FIG. 3 is an enlarged fragmented sectional view in elevation of the lower part of the mechanism of FIG. 1 taken along line 3—3, but with the damper plate in the closed position.
Figure 4:
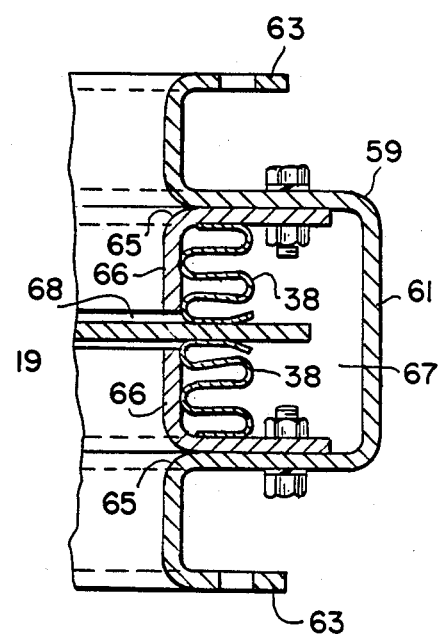
FIG. 4 is an enlarged sectional view taken along the line 4—4 of FIG. 1, with the damper plate in the closed position.
Figure 5:
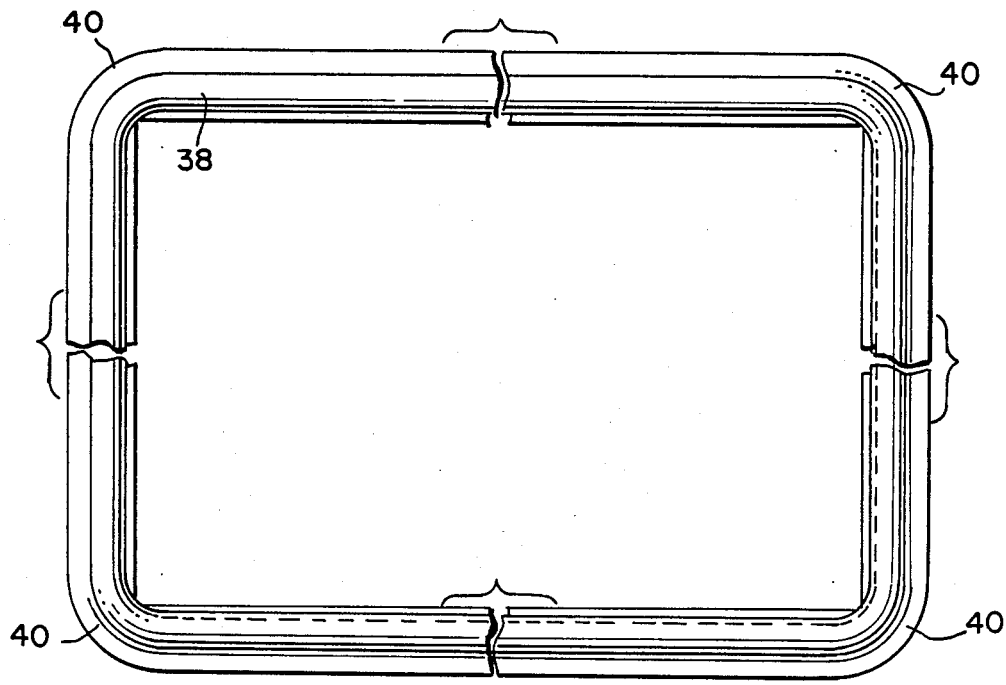
FIG. 5 is a sectional view taken along the line 5—5 of FIG. 3 to shown an end view of one of the bellows shaped seal elements employed in the embodiment of FIG. 1.

The lower frame member 11 comprises an upper horizontal section 33, two side sections 35 and a lower horizontal section 37 interconnected at their ends to form the rectangular shape of the frame member 11. Sections 33, 35, and 37 comprise a housing defining a hollow rectangular annulus, in which there are mounted two opposed multi-convoluted bellows shaped seal elements 38, as shown in FIGS. 3-5, each in the form of a rectangular annulus, having rounded corners 40, and each operable to engage opposite sides of the plate 19 when the plate 19 is in the closed position. The bellows shaped seal elements are compressed into their positions shown in the drawings so as to have a natural spring bias tending to cause them to expand and so that they engage the side surfaces of the plate 19 with a substantial spring force to form a seal around the perimeter of each side of the plate 19. When the plate 19 is in the open position, the seal elements 38 will resiliently expand under the force of their spring bias to engage each other. When the plate is moved from the open position to the closed position, the plate 19 slices between the opposed seal members 38 forcing them apart. For this purpose, the bottom edge 36 of the plate 19 is bevelled to form a point in cross section. In addition, the bottom edge 36 of the plate 19 is concave in an inverted vee configuration as viewed in FIG. 1, so that it feeds between the corners of the seal elements 38 first. With this arrangement, the plate 19 will reliably feed between the seal elements 38 upon moving from the open position to the closed position with no special guide or feed strips needed to start the plate feeding between the elements 38.

The upper horizontal section 33, as best shown in FIG. 3, comprises two U-shaped side members 39 having outer legs 41 by which the frame section 33 is connected with the duct sections 13 and 15. The U-shaped members 39 have inner legs 43, on the upper ends of which are welded angles 45. Bolted to the angles 45 are bonnet strips 47 which extend inwardly toward each other. The bonnet strips 47 have at their inner ends upwardly extending lips 49 facing each other and defining a gap 50 through which the damper plate 19 is moved up and down. Sandwiched between the angles 45 and the bonnet strips 47 are flat leaf seal members 51 extending inwardly and curved downwardly to engage opposite sides of the damper plate 19. The flat leaf seal members 51 are spring bias to press against the sides of the damper plate 19. Bolted to the inner sides of the legs 43 are angle members 53 having vertical legs 52 engaging the legs 43 and inwardly extending horizontal legs 55 extending toward each other and defining between the ends thereof, a gap 57 through which the damper plate 19 can be moved in and out. The members 39, 47, and 53 enclose the portion 54 of the hollow rectangular annulus provided by the upper frame section 33. The upper sides of each of the seal members 38 is contained in the portion 54 and are preferably welded to vertical legs 52 of the angle member 53.

The side sections 35 as shown in FIG. 4, each comprise a double U-shaped member 59 having a rectangular middle section 61 and having legs 63 on each side thereof. The legs 63 used to connect the side sections to the duct sections 13 and 15. Bolted to the inner sides of the middle section 61 are angle members 65 having horizontal legs engaging the side walls of the section 61 and vertical legs 66 extending toward and facing each other to define a gap 68 between which slides the plate 19. The angle members 65 in side sections 35 correspond to the angle members 53 in upper section 33. The middle section 61 of the U-shaped member 59 and the angle members 65 enclose the portion 67 of the hollow rectangular annulus provided by the side sections 35. The seal elements 38 preferably are welded to the angle members 65 adjacent to where they are bolted to the U-shaped frame member.

The bottom frame section 37 as shown in FIG. 3, comprises a base element 69 to which are bolted angles 71. U-shaped members 73 are welded to the angles 71. The U-shaped members 73 have outer legs 75 by which the elements 73 can be bolted to the duct sections 13 and 15. The inner legs 76 of the U-shaped members 73 are bolted to angle members 77 which correspond to the angle members 53 in the upper section 33. The angle members 77 have vertical legs 78 engaging the legs 76 and horizontal legs 80 extending toward and facing each other defining a gap 82 between which the bottom of a plate 19 can slide when it is moved to its fully closed position. The base 69, the U-shaped members 73 and the angle members 77 enclose the portion 79 of the hollow rectangular annulus provided by the bottom section 37. The seal members 38 preferably are welded to the vertical legs 78 of the angle members 77 adjacent where they are bolted to the U-shaped members 73.

The seal members 38 thus, extend around through the hollow rectangular annulus defined by the frame sections 33, 35, and 37. At the corners of the frame sections 33, 35, and 37, where the frame sections join together, curved angle pieces 84, shown in FIG. 1, are provided to interconnect the angle members 53, 65, and 77. These curved angle pieces 84 provide rounded inner corners for the hollow rectangular annulus to accomodate the rounded corners of the seal elements 38. The curved pieces 84 have an L-shaped cross section corresponding to the L-shaped cross section of the angle members 53, 65, and 77. As indicated above, the seal elements 38 may have their outer ends welded to inside surfaces in these sections. Alternatively, the seal members may be unfastened to any portion of the frame sections and merely housed within the hollow rectangular annulus in the position shown in the drawings.

To make the seal elements 38, a flat strip of sheet metal is rolled into a circular cylinder and the ends are butt welded together to form the cylinder, having a curvature corresponding to the curvature at the rounded corners 40 of the seal elements 38. Convolutions in the cylinder are then punched, rolled, or hydroformed radially to form a bellows shaped cylinder having convolutions corresponding to the convolutions in the seal elements 38. The cylinder is then cut into four 90 degree pieces, which are to become the rounded corners 40 of the seal elements 38. Straight pieces of the sheet metal are then break or roll formed into convolutions to provide the linear side portions of the seal elements 38. The linear side portions and the 90 degree corner sections are then butt welded together to form the seal elements 38 in the form of a rectangular annulus with rounded corners.

Figure 6:
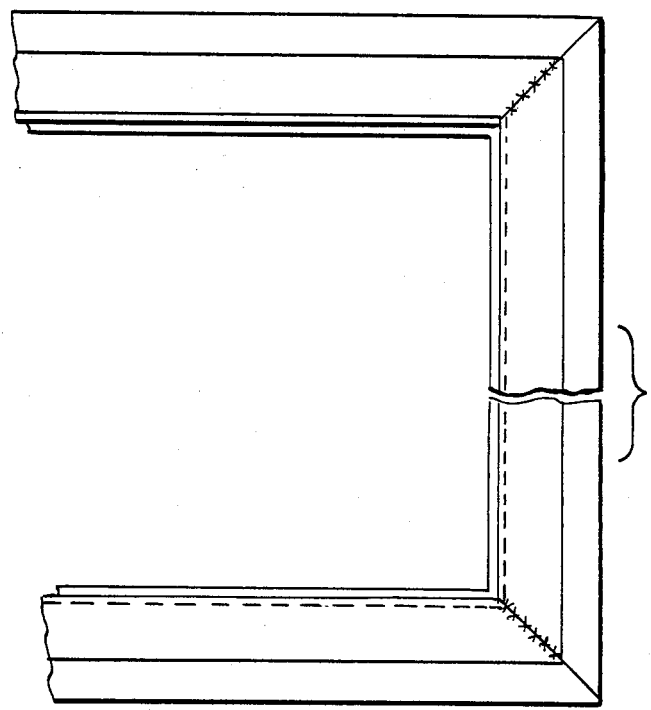
FIG. 6 is a sectional view similar to FIG. 5 showing an end view of a bellows shaped seal element in accordance with an alternative embodiment of the invention.

Instead of forming the elements 38 with rounded corners, they may be formed with square corners as shown in FIG. 6, in which case the flat pieces of sheet metal are break or roll formed into convolutions to providee the linear sides 85 of the seal element. These convoluted sections are then mitered at the ends at 45 degrees. The mitered ends are then welded together by positioning the mitered ends to be welded together adjacent to one another leaving a gap of 1/32, to 1/64 of an inch and filling the gap with welding filler material. All but one half inch of the mitered joint at the outer tip end of the seal element on the side where it engages the damper plate is welded together in this manner. This joint structure enables the bellows shaped elements to retain their shape when the materials at the mitered joints shrink upon cooling after welding the joints together.

Figure 8:
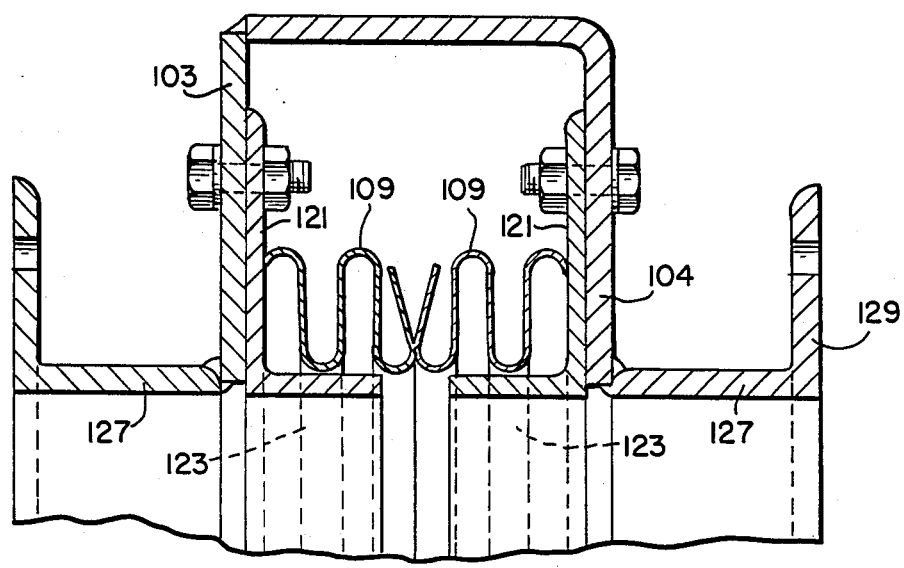
FIG. 8 is an enlarged sectional view taken along the line 8—8 of FIG. 7.

Alternatively, the bellows shaped seal elements may be round as shown in the embodiment of FIGS. 7 and 8. This embodiment, designed to connect between round duct sections, comprises frame members 100 and 101 located horizontally along side each other and a damper plate 102 slides between an open position in which it is in the frame member 100 and a closed position in which it is in the frame member 101. The frame member 101 comprises a parallel pair of plates 103 and 104 between which the damper plate 102 slides when it is moved to the closed position. The plates 103 define a central round opening 105 which communicates with the duct sections between which the flow of gases is to be controlled by the opening and closing of the damper plate. Around the perimeter of the opening 105 contained between the plates 103 are two opposed round bellows shaped seal elements 109. When the damper plate 102 is in the open position as shown in FIGS. 7 and 8, the seal elements 109 will engage each other and when the damper plate 102 is slid to a closed position, it will separate the seal elements 109 and the seal elements will engage opposite sides of the damper plate. The damper plate 102 is moved between an open position and a closed position by a mechanism similar to that shown in FIGS. 1 and 2, except that in addition, rollers 111 and 113 are provided in the frame members 100 and 101 respectively to support and facilitate the sliding motion of the plate 102 as it moves horizontally between its open and closed positions. As shown in FIG. 8, the plates 103 have flanges 121 bolted to the inner sides thereof and positioned at the periphery of the opening 105. The flanges 121 have inwardly directed rims 123 extending toward each other and defining a gap between which the plate 102 slides when it is moved to its closed position. The outer sides of the seal elements 109 are welded to the flanges 121. The plates 103 have outwardly extending circular bands 127 welded thereto at the opening 105. The ends of the bands 127 are formed into flanges 129 for connecting the frame member 101 to round duct sections, between which flow is to be controlled.

In this embodiment, the round bellows shaped elements 109 are made by welding the ends together of a flat sheet of metal to form the circular cylinder and then convolutions in the cylinder are then punched, rolled, or hydroformed radially to form the round bellows shaped elements 109.

The above description is of preferred embodiments of the invention and many modifications may be made thereto without departing from the spirit and scope of the invention, which is defined in the appended claims.

What is claimed is:

1. A combination of a damper plate for controlling flow in a duct, said damper plate being movable between an open position entirely removed from said duct and a closed position blocking said duct, and a sealing mechanism for said damper plate, said sealing mechanism comprising;

at least one seal element in the form of an annulus and positioned to engage one side of said plate when said plate is in said closed position, said seal element being in the shape of a bellows made of solid material having at least two convolutions, the mechanical characteristics of the solid material of said element causing said element to have a spring bias tending to cause the bellows shape of said element to expand so that said element engages the side of said plate when said plate is in said closed position with a force provided by the spring bias of said element, said seal element being disengaged from said damper plate and moving into the space that was occupied by said damper plate when it was in said closed position to enclose the flow in said duct when said damper plate is moved from said closed position to said open position, abutment means disposed opposite said seal element to allow said seal element to abuttingly engage said abutment means around the periphery of said seal element and said abutment means, whereby said seal element is operable to form with said abutment means and with said damper plate a single flat sealing surface free from any overlaps to provide an effective seal for eliminating leakage between said abutment means and said seal element when said damper plate is in the open position and between said seal element and said damper plate when said damper plate is in the closed position as a result of the convoluted shape of said seal element.

2. A combination as recited in claim 1, wherein said abutment means comprises a second seal element in the form of an annulus and positioned to engage the opposite side of said plate from that engaged by said first mentioned seal element when said plate is in said closed position, said second seal element being in the shape of a bellows made of solid material having at least two convolutions, the mechanical characteristics of the solid material of said second seal element causing said second seal element to have a spring bias tending to cause the bellows shape of said second seal element to expand so that said second seal element engages the side of said plate with the force provided by the spring bias of said second seal element.

3. A combination as recited in claim 2, wherein the spring bias of said first mentioned seal element and said second seal element are such that said first and second seal elements engage each other when said plate is moved to said open position.

4. A combination as recited in claim 3, wherein said seal elements are in the form of rectangular annuluses.

5. A combination as recited in claim 4, wherein said sealing mechanism further comprises a frame defining a hollow rectangular annulus housing said seal elements, said frame having gaps in which said plate is positioned when said plate is in a closed position.

6. A combination as recited in claim 5, wherein said frame comprises four linear side sections and said gaps are defined at the inner ends of said linear side sections, one of said linear side sections having a gap on the outer edge thereof, said plate moving through said last mentioned gap when said plate is moved between said open and said closed position.

7. A combination as recited in claim 4, wherein said plate is moved from said open position to said closed position by sliding in a plane containing said plate, and wherein the edge of said plate which first engages said seal elements when said plate is moved from said open position to said closed position is convex so that the sides of said edge engage said sealing elements first upon said plate being moved from said open position to said closed position.

8. A combination as recited in claim 1, wherein said seal element is in the form of a rectangular annulus.

9. A combination as recited in claim 1, wherein said seal element is in the form of a round cylinder.

10. A combination as recited in claim 1, wherein said sealing mechanism further comprises a frame defining a hollow annulus housing said seal element within said hollow annulus, said frame having gaps defined therein through which plate slides when said plate moves between said open position and said closed position.

11. A combination as recited in claim 1, wherein said seal element is defined by a wall formed into said convolutions with said wall being of uniform thickness in said convolutions and wherein said seal element engages said damper plate with the wall of one said convolutions of said uniform thickness.

12. A combination of a damper plate for controlling flow in a duct, said damper plate being movable between an open position and a closed position and a sealing mechanism for said damper plate, said sealing mechanism comprising;

at least one seal element in the form of a rectangular annulus having four linear sides positioned to engage one side of said plate when said plate is in said closed position, said seal element being in the shape of a bellows having at least two convolutions arranged axiallary with respect to the direction of flow in said duct, each of said linear sections of said rectangular annulus including said two convolutions, said seal element engaging said damper plate around the periphery of said damper plate when said damper plate is in said closed position, abutment means disposed opposite said seal element to allow said seal element to abuttingly engage said abutment means, whereby said seal element is operable to form with said abutment means and with said damper plate a single flat sealing surface free from any overlaps to provide an effective seal for eliminating leakage between said abutment means and said seal element when said damper plate is in the open position and between said seal element said said damper plate when said damper plate is in the closed position as a result of the convoluted shape of said seal element.

13. A combination as recited in claim 12, wherein said rectangular annulus has rounded corners.

14. A combination as recited in claim 12, wherein said rectangular annulus has mitered corners.

* * * * *

UNITED STATES PATENT AND TRADEMARK OFFICE
CERTIFICATE OF CORRECTION

PATENT NO. : 4,749,168

DATED : June 7, 1988

INVENTOR(S) : ROBERT K. MAXWELL ET AL

It is certified that error appears in the above-identified patent and that said Letters Patent is hereby corrected as shown below:

Column 7, line 11, change "axiallary" to --axially--.

Signed and Sealed this

Fifteenth Day of August, 1989

*Attest:*

DONALD J. QUIGG

*Attesting Officer*  *Commissioner of Patents and Trademarks*